(12) United States Patent
Adegawa

(10) Patent No.: US 7,268,201 B2
(45) Date of Patent: Sep. 11, 2007

(54) INSULATING-FILM FORMING MATERIAL AND INSULATING FILM USING THE SAME

(75) Inventor: Yutaka Adegawa, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 269 days.

(21) Appl. No.: 10/806,450

(22) Filed: Mar. 23, 2004

(65) Prior Publication Data

US 2004/0198855 A1  Oct. 7, 2004

(30) Foreign Application Priority Data

| Mar. 28, 2003 | (JP) | ............................ P.2003-090711 |
| Mar. 31, 2003 | (JP) | ............................ P.2003-095285 |
| Mar. 18, 2004 | (JP) | ............................ P.2004-077741 |

(51) Int. Cl.
*C08G 77/04* (2006.01)
*C08G 77/20* (2006.01)
*C07F 7/00* (2006.01)
*C07F 7/21* (2006.01)

(52) U.S. Cl. ............................ 528/37; 528/10; 528/38; 528/40; 528/25; 556/450; 556/455; 556/460

(58) Field of Classification Search .................. 528/37, 528/10, 25, 38, 40; 556/450, 455, 460
See application file for complete search history.

(56) References Cited

U.S. PATENT DOCUMENTS 5,412,053 A * 5/1995 Lichtenhan et al. ........... 528/9
5,589,562 A * 12/1996 Lichtenhan et al. ........... 528/9

FOREIGN PATENT DOCUMENTS

| JP | 11-40554 A | 2/1999 |
| JP | 2000-265065 A | 9/2000 |
| JP | 2000-265066 A | 9/2000 |

* cited by examiner

*Primary Examiner*—Sanza L. McClendon
(74) *Attorney, Agent, or Firm*—Sughrue Mion, PLLC

(57) ABSTRACT

A polymer having a repeating unit represented by formula (I) is used for an insulating-film forming material and an insulating film.

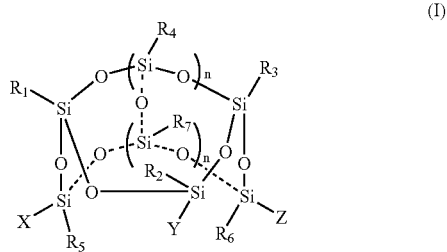

(I)

wherein $R_1$ to $R_7$ each are a monovalent hydrocarbon group, etc.; one of X, Y and Z is a specific siloxane group and the remaining two each are —O— or divalent silyl-containing group that bonds to (I) on the side of the oxygen atom of the group.

12 Claims, No Drawings

INSULATING-FILM FORMING MATERIAL AND INSULATING FILM USING THE SAME

BACKGROUND OF THE INVENTION

1. Field of the Invention

The present invention relates to an insulating-film forming material, more precisely, to that capable of forming a coating film having a suitable uniform thickness, as an interlayer insulating-film material for semiconductor devices and others, and the film cracks little and has good dielectric characteristics. In particular, the insulating-film forming material of the invention is suitable for forming porous. insulating films.

2. Description of the Related Art

Heretofore, silica ($SiO_2$) films formed in a vacuum process such as CVD are much used for interlayer insulating films in semiconductor devices and others. In recent years, insulating films that comprise, as the essential ingredient thereof, a hydrolyzed product of tetraalkoxysilane are formed in a coating process for more uniform interlayer insulating films, and they are referred to as SOG (spin on glass) films. With the increase in the degree of integration of semiconductor devices and others, organic SOG films have been developed for solving the problem of wiring delay. Comprising polyorganosiloxane as the essential ingredient thereof, the films serve as interlayer insulating films having a low dielectric constant.

CVD-$SiO_2$ films have a lowest dielectric constant of all inorganic material films, but their dielectric constant is about 4 or so. SiOF films have been investigated as CVD films having a low dielectric constant, and their dielectric constant is from about 3.3 to 3.5. However, the moisture absorption of the films is high, and the films are therefore problematic in that their dielectric constant may increase while they are used.

On the other hand, organic polymer films having a low dielectric constant of from 2.5 to 3.0 have a low glass transition temperature falling between 200 and 350° C. and have a large coefficient of thermal expansion, and are therefore problematic in that they may damage wiring. Organic SOG films are defective in that they may be readily oxidized and cracked in oxygen plasma ashing for resist peeling in multi-layered wiring pattern formation. Organic resins including organic SOG films are poorly adhesive to wiring materials, aluminium and aluminium-based alloys as well as copper and copper-based alloys, and are therefore problematic in that they may form voids around wires (concretely between wires and insulating material therearound). Water may penetrate into the voids to cause wire corrosion, and, in addition, the voids around wires may cause short circuits between wiring layers when via holes formed for multi-layered wiring are mispositioned, and, as a result, it lowers the reliability of the wired devices.

In that situation, known is an insulating-film forming, coating composition that contains a basket-structured organopolysiloxane, concretely an octasilsesquioxane hydride-containing copolymer, as an insulating-film material that has good insulating properties, heat resistance and durability (see JP-A 2000-265065 and JP-A 2000-265066). JP-A 11-40554 discloses an insulating-film forming, coating composition that contains a $T_8$ basket-structured siloxane (silsesquioxane), and it says that, when an insulating film of low density is formed through crosslinking polymerization, then the dielectric constant-of the film may be reduced.

SUMMARY OF THE INVENTION

However, with the increase in the degree of integration and with the increase in the number of multi-layers of semiconductor devices, better electric insulation between conductors is desired in the art, and, interlayer insulating-film materials having a lower dielectric constant and having better cracking resistance and heat resistance are therefore desired. The above-mentioned, insulating-film forming materials that contain a known basket-structured polysiloxane (polysilsesquioxane) are still unsatisfactory in point of the heat resistance, the cracking resistance and the dielectric characteristics thereof.

Accordingly, the present invention relates to a film forming material that solves the problems noted above. More precisely, the invention is to provide a film forming material that may form a coating film having a suitable uniform thickness as an interlayer insulating film in semiconductor devices and others, and the film has good heat resistance and cracks little and has good dielectric characteristics.

We, the present inventors have found that the above-mentioned object of the invention can be attained by the following constitution (1) to (9):

(1) An insulating-film forming material comprising a polymer (A) that has, as a repeating unit thereof, a structure represented by the following general formula (I):

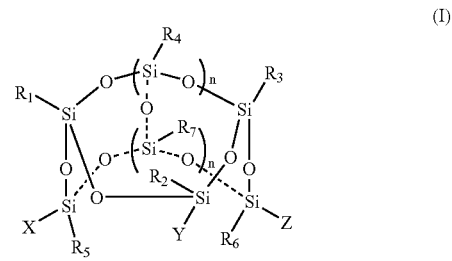

wherein $R_1$ to $R_7$ are the same or different, and each represents a monovalent group; one of X, Y and Z represents a group represented by formula (IA), and another one of X, Y and Z is —O—, and the other one of X, Y and Z is a group represented by formula (IB) wherein the oxygen atom that directly bonds to the silicon atom in formula (IB) is also connected to formula (I); and n indicates an integer of from 1 to 10:

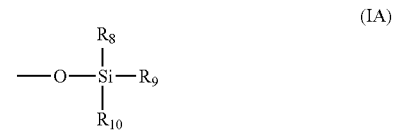

wherein $R_8$ to $R_{10}$ are the same or different, and each represents a monovalent group,

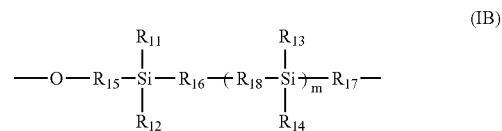

wherein $R_{11}$ to $R_{14}$ are the same or different, and each represents a monovalent group; $R_{15}$ to $R_{17}$ are the same or different, and each represents a single bond or a divalent group; $R_{18}$ represents a single bond or —O—; and m indicates an integer of from 0 to 10.

(2) The insulating-film forming material of above (1), wherein $R_1$ to $R_{14}$ in formula (I) are the same or different, and each represents a hydroxyl group, amoriovalent hydrocarbon group, a monovalent group capable of becoming a hydrocarbon group through a Diels-Alder reaction followed by an elimination reaction, a group derived from a monovalent hydrocarbon group by substituting a part of the carbon atom(s) in the monovalent hydrocarbon group with a silicon atom, or a group derived from a monovalent group capable of becoming a hydrocarbon group through a Diels-Alder reaction followed by an elimination reaction, by substituting a part of the carbon atom(s) in the monovalent group with a silicon atom, and $R_{15}$ to $R_{17}$ are the same or different, and each represents a single bond, a divalent hydrocarbon group, or a divalent group capable of becoming a hydrocarbon group through a Diels-Alder reaction followed by an elimination reaction.

(3) The insulating-film forming material of above (2), wherein at least one of $R_1$ to $R_{17}$ in formula (I) satisfies at least one of the following conditions (i) to (iii): at least one of $R_1$ to $R_{17}$ include at least one of (i) at least one carbon-carbon triple bond; (ii) at least one of a carbon-carbon double bond and a carbon-nitrogen double bond that conjugates with an aromatic group; and (iii) at least one aromatic ring having at least 10 carbon atoms.

(4) An insulating film obtained by using an insulating-film forming material of any of above (1) to (3).

(5) A porous insulating-film forming material comprising: a polymer that has, as a repeating unit thereof, a structure represented by formula (I); and at least one of a compound (B-1) and particles (B-2), (B-1) a compound having a boiling or decomposition point of 250° C. to 450° C., (B-2) hollow particles:

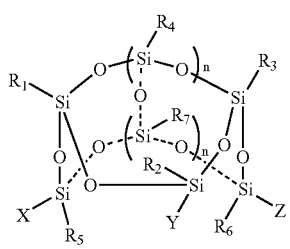

(I)

wherein $R_1$ to $R_7$ are the same or different, and each represents a monovalent group; one of X, Y and Z represents a group represented by formula (IA), and another one of X, Y and Z is —O—, and the other one of X, Y and Z is a group represented by formula (IB) wherein the oxygen atom that directly bonds to the silicon atom in formula (IB) is also connected to formula (I); and n indicates an integer of from 1 to 10:

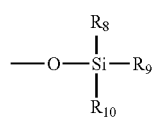

(IA)

wherein $R_8$ to $R_{10}$ are the same or different, and each represents a monovalent group,

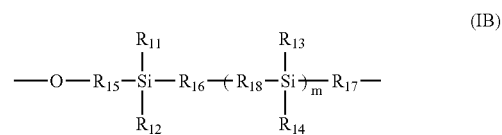

(IB)

wherein $R_{11}$ to $R_{14}$ are the same or different, and each represents a monovalent group; $R_{15}$ to $R_{17}$ are the same or different, and each represents a single bond or a divalent group; $R_{18}$ represents a single bond or —O—; and m indicates an integer of from 0 to 10.

(6) A porous insulating-film forming material comprising a polymer that has, as a repeating unit thereof, a structure represented by formula (I'):

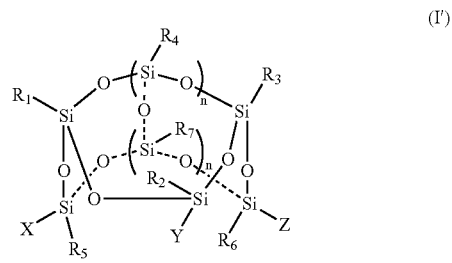

(I')

wherein $R_1$ to $R_7$ are the same or different, and each represents amonovalent group; one of X, Y and Z represents a group represented by formula (IA), and another one of X, Y and Z is —O—, and the other one of X, Y and Z is a group represented by formula (IB) wherein the oxygen atom that directly bonds to the silicon atom in formula (IB) is also connected to formula (I); and n indicates an integer of from 1 to 10:

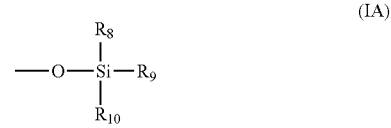

(IA)

wherein $R_8$ to $R_{10}$ are the same or different, and each represents a monovalent group,

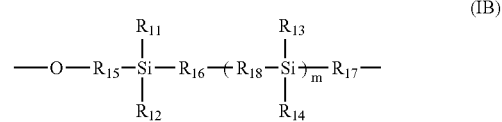

(IB)

wherein $R_{11}$ to $R_{14}$ are the same or different, and each represents a monovalent group; $R_{15}$ to $R_{17}$ are the same or different, and each represents a single bond or a divalent group; $R_{18}$ represents a single bond or —O—; and m indicates an integer of from 0 to 10; and at least one of $R_1$ to $R_{14}$ satisfies at least one of the following conditions (a) to (c): at least one of $R_1$ to $R_{14}$ includes at least one of (a) a structure that decomposes under heat at 250° C. to 450° C.

to generate gas; (b) a structure that decomposes through UV irradiation to generate gas; and (c) a structure that decomposes through electron beam irradiation to generate gas.

(7) The porous insulating-film forming material-of above (5) or (6), wherein at least one of $R_1$ to $R_{17}$ in formula (I) or (I') satisfies at least one of the following conditions ($\alpha$) and ($\beta$):

($\alpha$) at least one of $R_1$ to $R_{14}$ is a monovalent hydrocarbon group, a monovalent group capable of becoming a hydrocarbon group through a Diels-Alder reaction followed by an elimination reaction, a group derived from a monovalent hydrocarbon group by substituting a part of the carbon atom(s) in the monovalent hydrocarbon group with a silicon atom, or a group derived from a monovalent group capable of becoming a hydrocarbon group through a Diels-Alder reaction followed by an elimination reaction, by substituting a part of the carbon atom(s) in the monovalent group with a silicon atom; and ($\beta$) at least one of $R_{15}$ to $R_{17}$ is a divalent hydrocarbon group, or a divalent group capable of becoming a hydrocarbon group through a Diels-Alder reaction followed by an elimination reaction.

(8) The porous insulating-film forming material of any of above (5) to (7), wherein at least one of $R_1$ to $R_{17}$ in formula (I) or (I') satisfies at least one of the following conditions (i) to (iii):
at least one of $R_1$ to $R_{17}$ includes at least one of
(i) at least,one carbon-carbon triple bond;
(ii) at least one of a carbon-carbon double bond and a carbon-nitrogen double bond that conjugates with an aromatic group; and
(iii) at least one aromatic ring having at least 10 carbon atoms.

(9) A porous insulating film obtained by using an insulating-film forming material of any of above (5) to (8).

DETAILED DESCRIPTION OF THE INVENTION

The insulating-film forming material of the invention is significantly characterized in that it contains a specific basket-structured organopolysiloxane (polysilsesquioxane) of formula (I) or (I'), as so mentioned hereinabove. Specifically in the invention, $T_7$ to $T_{25}$ basket-structured siloxane (silsesquioxane) of formula (I) or (I') in which $R_1$ to $R_{14}$ have a specific organic group may have fine voids in the molecule owing to its cubic structure, and, in addition, it crosslinks through heat treatment to have a three-dimensional structure converted from a two-dimensional structure thereof, and is therefore further polymerized to have an increased molecular weight. As a result, the compound may form an insulating film having a much lower density, and the dielectric constant of the film may be thereby much lowered. In particular, we, the present inventors have found that, since $R_1$ to $R_{14}$ do not include a hydrogen atom, the film has excellent properties in that its chemical stability is good, its dielectric constant does not increase with time, its shrinkage is low and it therefore cracks little. In addition, we have further found that, since the film forming material does not contain a fluorine atom, the film formed of it has further advantages in that its adhesiveness does not lower and it does not react with barrier metals to cause interlayer peeling.

When the material that contains the polyorganosiloxane (polysilsesquioxane) of the invention as a base polymer is applied to a substrate such as silicon wafer in a mode of dipping or spin coating, then it may well fill the grooves in fine patterns, and when it is heated to remove the organic solvent and to crosslink the polymer, then it forms a glassy and/or macro-polymer film. The resulting film has good heat resistance and has a low dielectric constant, and it may form a thick-filmy insulator that cracks little.

The polymer (resin) for use in the invention is described in detail hereinunder.

The resin having a structure of formula (I) or (I') is a $T_7$ to $T_{25}$ basket-structured organopolysiloxane (polysilsesquioxane) in which $R_1$ to $R_{14}$ have a specific organic group, as so mentioned hereinabove. Preferably, the resin having a structure of formula (I) or (I') for use in the invention has a weight-average molecular weight of from 1,000 to 10,000, 000. Having a molecular weight that falls within the range, the organopolysioxane (polysilsesquioxane) of the invention can be used in the insulating-film forming material irrespective of the level of the molecular weight thereof.

The first aspect of the invention is an insulating-film forming material that contains a resin (A) having, as repeating units thereof, a structure of formula (I).

The second aspect of the invention is a porous insulating-film forming material that contains a resin (A) having, as repeating units thereof, a structure of formula (I), and a compound (B-1) having a boiling point or a decomposition point that falls between 250° C. and 450° C.

The third aspect of the invention is a porous insulating-film forming material that contains a resin (A) having, as repeating units thereof, a structure of formula (I), and hollow particles (B-2).

The fourth aspect of the invention is a porous insulating-film forming material that contains a resin (A') having a structure of formula (I'), or that is a resin (A) in which at least one of plural $R_1$ to $R_{14}$ satisfies at least one of the following-conditions (a) to (c):
(a) having a structure that decomposes under heat at 250° C. to 450° C. to generate gas,
(b) having a structure that decomposes through UV irradiation to generate gas,
(c) having a structure that decomposes through electron beam irradiation to generate gas.

The resin (A) for use in the first, second and third aspects of the invention is described below.

In the first, second and third aspects of the invention, plural $R_1$ to $R_7$ may be the same or different, and each represents a monovalent group.

In formula (IA), $R_8$ to $R_{10}$ may be the same or different, and each represents a monovalent group.

In formula (IB), $R_{11}$ to $R_{14}$ may be the same or different, and each represents a monovalent group. $R_{15}$ to $R_{17}$ may be the same or different, and each represents a single bond or adivalent group. $R_{18}$ is a single bond or —O—. m is an integer of from 0 to 10. n is an integer of from 1 to 10.

In formula (I), preferably, $R_1$ to $R_{14}$ each are a hydroxyl group, a monovalent hydrocarbon group, an alkoxy group, a monovalent group capable of being a hydrocarbon group through Diels-Alder reaction followed by subsequent elimination reaction, a group derived from a monovalent hydrocarbon group by substituting a part of the carbon atoms in the group with a silicon atom, a group derived from an alkoxy group by substituting a part of the carbon atoms in the group with a silicon atom, or a group derived from a monovalent group capable of being a hydrocarbon group through Diels-Alder reaction followed by subsequent elimination reaction, by substituting a part of the carbon atoms in the group with a silicon atom.

In the second and third aspects, preferably, $R_1$ to $R_{14}$ each are a monovalent hydrocarbon group, an alkoxy group, a monovalent group capable of being a hydrocarbon group through Diels-Alder reaction followed by subsequent elimination reaction, a group derived from a monovalent hydrocarbon group by substituting a part of the carbon atoms in the group with a silicon atom, a group derived from an alkoxy group by substituting a part of the carbon atoms in the group with a silicon atom, or a group derived from a monovalent group capable of being a hydrocarbon group through Diels-Alder reaction followed by subsequent elimination reaction, by substituting a part of the carbon atoms in the group with a silicon atom.

Preferably, the number of hydroxyl groups is from 0 to 4 per the repeating unit, more preferably from 0 to 1, even more preferably 0.

The monovalent hydrocarbon group includes the following (a-1) to (a-4) and (b-1) to (b-4). Preferably, they have at most 20 carbon atoms.

(a-1) Monovalent, linear, branched or cyclic, saturated hydrocarbon group (alkyl group), (a-2) Ethylenic carbon-carbon double-bond having, monovalent, linear, branched or cyclic hydrocarbon group, (a-3) Carbon-carbon tripe-bond having, monovalent, linear, branched or cyclic hydrocarbon group, (a-4) Ethylenic carbon-carbon double-bond having and carbon-carbon tripe-bond having, monovalent, linear, branched or cyclic hydrocarbon group, (b-1) Group derived from the above (a-1) to (a-4), by substituting from 1 to 10 hydrogen atoms in the group with a monovalent aromatic hydrocarbon group, (b-2) Group derived from the above (a-1) to (a-4) and (b-1), by substituting from 1 to 10 methylene groups therein with a divalent aromatic hydrocarbon group, (b-3) Group derived from the above (a-1) to (a-4), (b-1) and (b-2), by substituting from 1 to 10 methylene groups therein with a trivalent aromatic hydrocarbon group, (b-4) Group derived from the above (a-1) to (a-4) and (b-1) to (b-3), by substituting from 1 to 10 quaternary carbon atoms therein with a tetravalent aromatic hydrocarbon group.

In these, the number of the groups to be substituted is preferably from 1 to 8, more preferably from 1 to 4.

Examples of (a-1) to (a-4) are mentioned below.

(a-1) Linear, branched or cyclic alkyl group such as methyl, ethyl, n-propyl, isopropyl, cyclopropyl, n-butyl, isobutyl, t-butyl, n-pentyl, isopentyl, t-pentyl, neopentyl, cyclopentyl, n-hexyl, cyclohexyl, octyl, nonyl, dodecyl, hexadecyl, octadecyl; crosslinked cyclic hydrocarbon group (alicyclic group) such as 1-adamantyl; spiro-hydrocarbon group such as spirobicyclohexyl.

(a-2) Linear, branched or cyclic alkenyl group such as vinyl, allyl, isopropenyl, 1-butenyl, 2-butenyl, 2-methyl-propen-1-yl, 1-pentenyl, 2-pentenyl, 3-pentenyl, 2-methyl-buten-1-yl; double-bond having cyclic terpene-type hydrocarbon group such as 5-norbornen-2-yl.

(a-3) Alkynyl group such as ethynyl, propargyl; alkanedienyl group such as 1,4-hexadienyl; alkanetrienyl group with three double bonds; alkanediynyl group with two triple bonds; alkanetriynyl group with three triple bonds.

(a-4) Enynyl group and others having both double bond and triple bond, such as 5-ethynyl-1,3,6-heptatrienyl.

Aromatic hydrocarbon groups to be substituted in (b-1) to (b-4) include the following:

Aromatic hydrocarbon groups to be substituted in (b-1) include phenyl, naphthyl, anthryl, phenanthryl, pyrenyl and other monovalent aromatic hydrocarbon groups mentioned below.

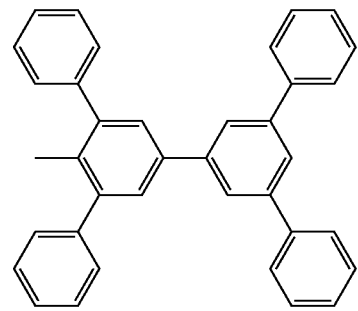

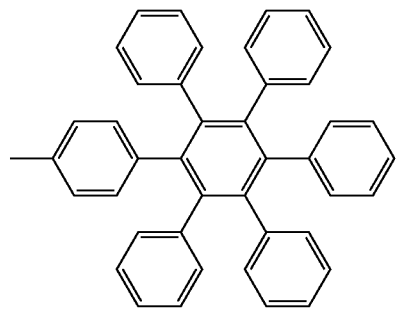

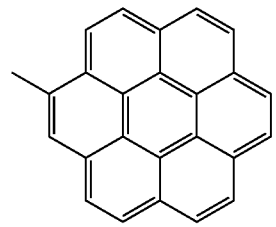

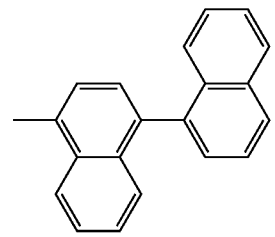

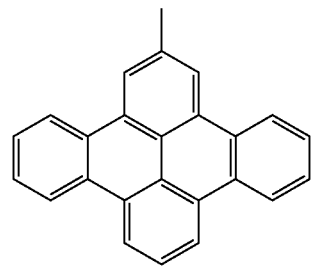

Aromatic hydrocarbon groups to be substituted in (b-2) include arylene groups such as 1,4-phenylene, 2,7-phenanthrene, 4,4'-bis(phenyl), and other divalent aromatic hydrocarbon groups mentioned below.

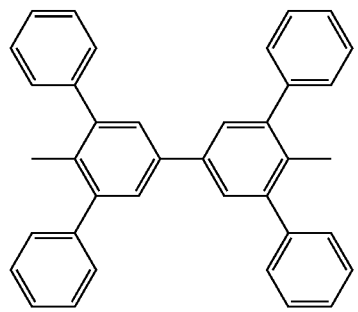

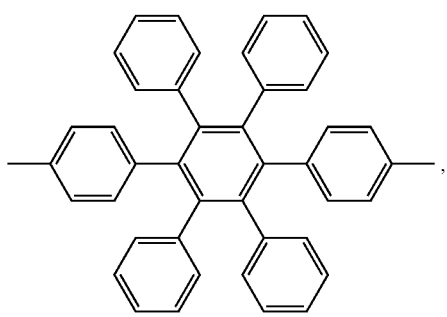

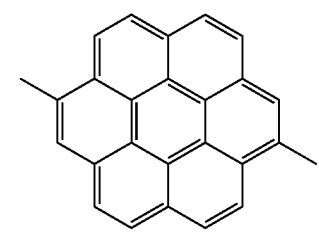

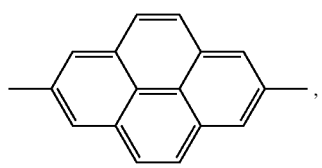

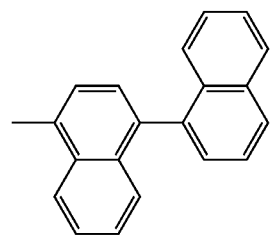

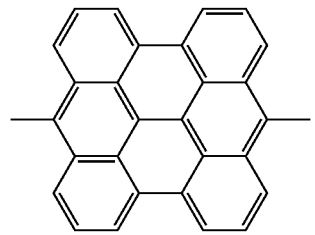

-continued

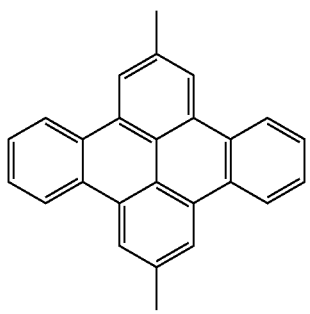

Aromatic hydrocarbon groups to be substituted in (b-3) include trivalent aromatic hydrocarbon groups such as 1,3,5-benzenetriyl, 1,2,6-naphthalenetriyl.

Aromatic hydrocarbon groups to be substituted in (b-4) include tetravalent aromatic hydrocarbon groups such as 1,2,4,5-benzenetetrayl, 1,4,5,8-anthracenetetrayl.

One example of (b-2) that is derived from cyclic-hydrocarbon having (a-1), by substituting the carbon atoms in (a-1) with one aromatic hydrocarbon group and three divalent aromatic hydrocarbon groups is mentioned below.

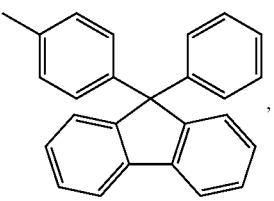

Examples of (b-3) that is derived from triple-bond having (a-3), by substituting the carbon atoms in (a-3) with two monovalent aromatic hydrocarbon groups, one divalent aromatic hydrocarbon groups and one trivalent aromatic hydrocarbon group are mentioned below. These are preferable, since they may form different hydrocarbon groups through chemical reaction.

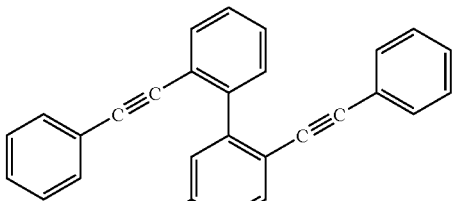

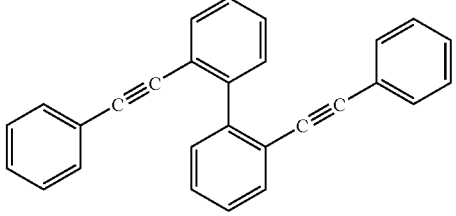

-continued

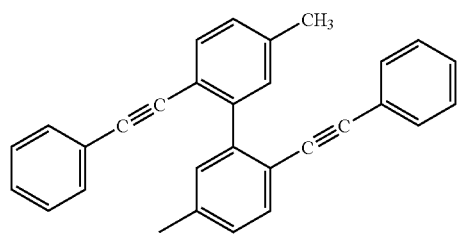

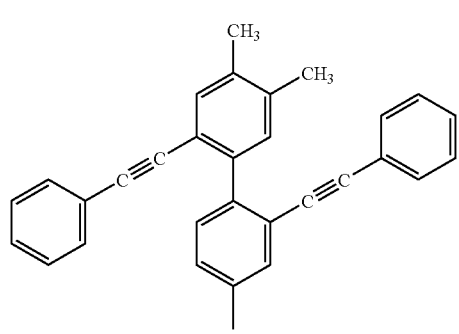

Of (b-2) or (b-3), those constructed by substituting methylene or methine in a cyclopropane structure with a divalent or trivalent benzene ring may have a benzocyclobutene structure. These hydrocarbon groups may form different hydrocarbon groups through chemical reaction, and are preferable in the invention. More concretely, examples of the structure are mentioned below.

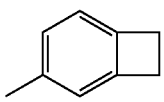 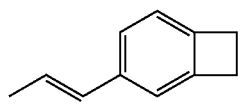

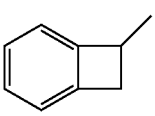 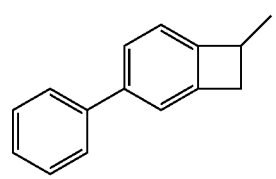

The monovalent group capable of being a hydrocarbon group through Diels-Alder reaction followed by subsequent elimination reaction is the following (c).

(c) Group having a hetero-atom having conjugated diene, or having conjugated, two aromatic weak double bonds. This reacts with a dienophile (diene-philic compound) such as substituted alkene or substituted alkyne in a mode of concerted addition [4+2], and then the hetero-atom having crosslinked site is eliminated from it to release a site to give a hydrocarbon group such as benzene ring.

Examples of the reaction mode of (c) are mentioned below.

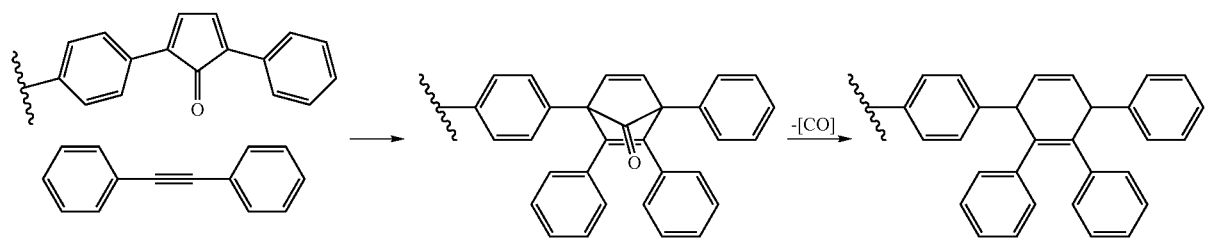

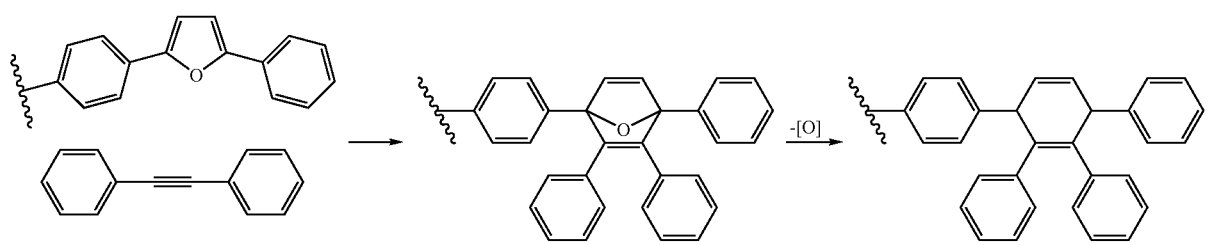

-continued

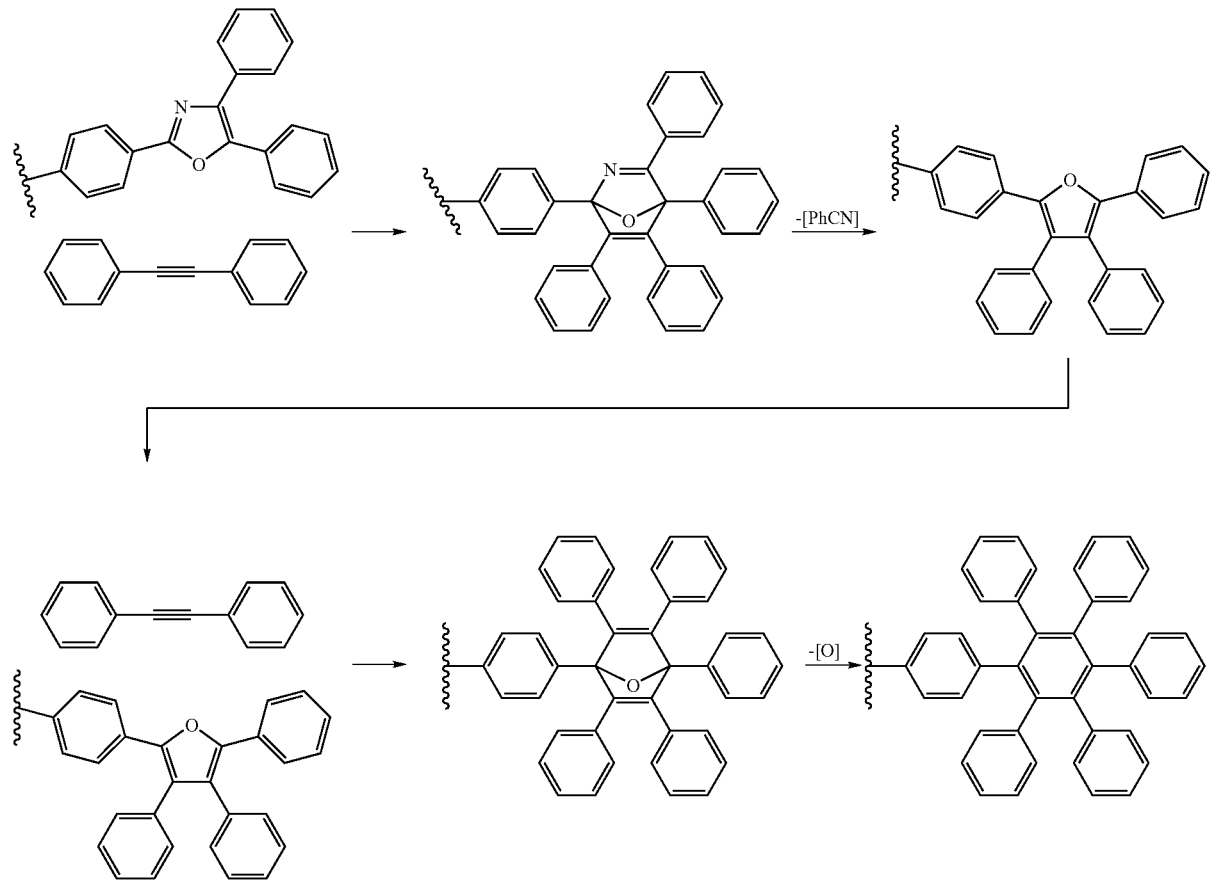

(c) includes the following:
- (c-1) Group derived from the above (b-1) to (b-4), by substituting from 1 to 3 aromatic rings in the group with a cyclopentadienone structure or an aromatic hydrocarbon-substituted cyclopentadienone structure having the same valence,
- (c-2) Group derived from the above (b-1) to (b-4), by substituting from 1 to 3 aromatic rings in the group with a furan structure or an aromatic hydrocarbon-substituted furan structure having the same valence,
- (c-3) Group derived from the above (b-1) to (b-4), by substituting from 1 to 3 aromatic rings in the group with an oxazole structure or an aromatic hydrocarbon-substituted oxazole structure having the same valence.

More concrete examples of (c-1) to (c-3) are mentioned below.

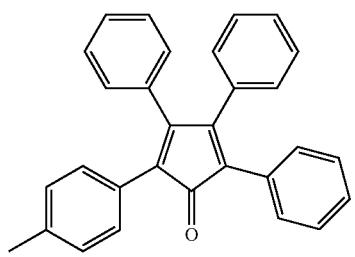

-continued

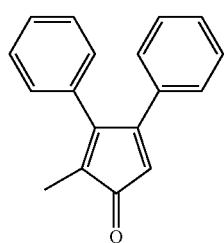

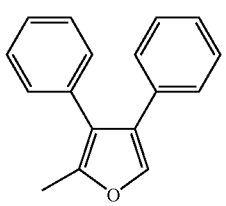

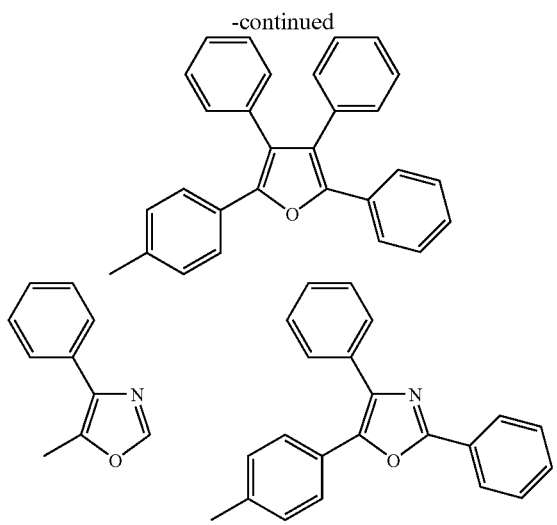

The group derived from a monovalent hydrocarbon group by substituting a part of the carbon atoms in the group with a silicon atom is the following (d). Preferably, this has at most 20 carbon atoms.

(d) Group derived from the above (a-1) to (a-4) and (b-1) to (b-4) by substituting from 1 to 10 carbon atoms in the group with a silicon atom. (d) contains at least one carbon atoms.

In this, the number of substituted silicon atoms is preferably from 1 to 8, more preferably from 1 to 4.

Examples of (d) are trimethylsilyl, tris(trimethylsilyl)silyl, and the following groups.

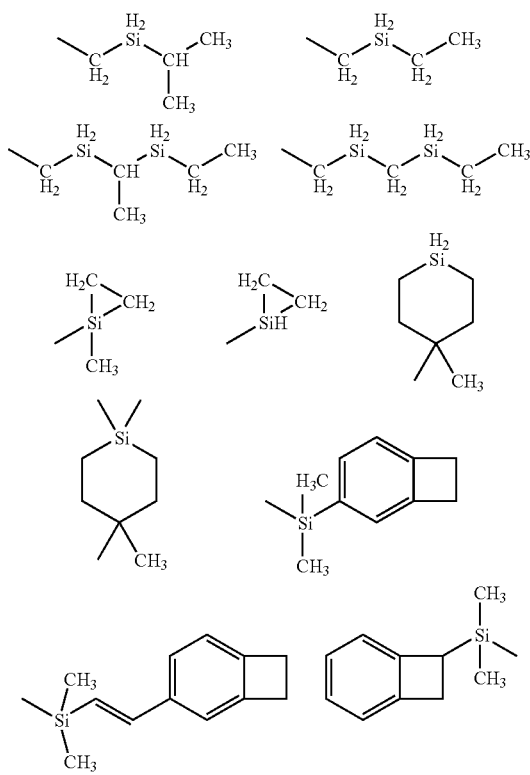

The group derived from a monovalent group capable of being a hydrocarbon group through Diels-Alder reaction followed by subsequent elimination reaction, by substituting a part of the carbon atoms in the group with a silicon atom is the following (e).

(e) Group derived from the above (c-1) to (c-3) by substituting from 1 to 10 carbon atoms in the group with a silicon atom.
(e) contains at least one carbon atoms.

In this, the number of substituted silicon atoms is preferably from 1 to 8, more preferably from 1 to 6.

Examples of (e) are mentioned below.

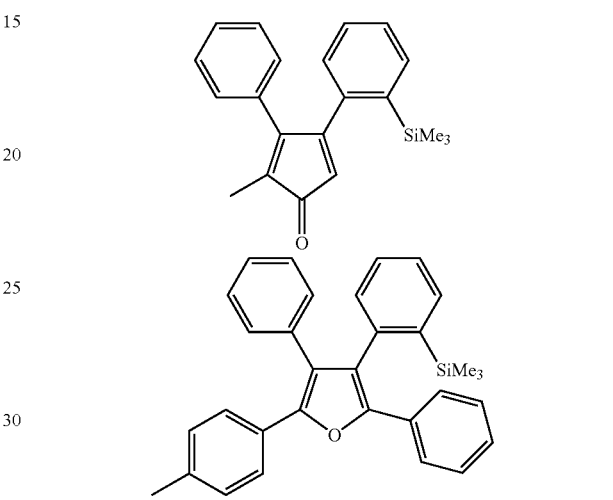

Preferably, $R_1$ to $R_{14}$ are selected from the above-mentioned groups in any desired manner.

$R_{15}$ to $R_{17}$ may be the same or different, and preferably, each represents a single bond, a divalent hydrocarbon group, or a divalent group capable of being a hydrocarbon group through Diels-Alder reaction followed by subsequent elimination reaction. These may be selected from the examples of $R_1$ to $R_{14}$ with no Si atom, and one hydrogen atom on the carbon atom of the groups is substituted with a single bond. Preferably, these are selected from the preferred examples of $R_1$ to $R_{14}$ mentioned above with no silicon atom, and one hydrogen atom on the carbon atom of the groups is substituted with a single bond.

Preferably, at least one of $R_1$ to $R_{17}$ in formula (I) satisfies at least one of the following (i) to (iii):

(i) having at least one carbon-carbon triple bond,
(ii) having at least one carbon-carbon double bond or carbon-nitrogen double bond that conjugates with an aromatic group,
(iii) having at least one aromatic ring with at least 10 carbon atoms.

For the condition (i), it is desirable that the polymer has from 1 to 7 triple bonds per one $T_7$ structure (that is, from 1 to 25 triple bonds per one $T_{25}$ structure), more preferably from 1 to 4 triple bonds per one $T_7$ structure. For the condition (ii), it is desirable that the polymer has from 1 to 14 carbon-carbon double bonds or carbon-nitrogen double bonds each conjugating with an aromatic group, per one $T_7$ structure, more preferably from 1 to 4 such double bonds per one $T_7$ structure. For the condition (iii), it is desirable that the polymer has from 1 to 7 aromatic rings with at least 10 carbon atoms per one $T_7$ structure (that is, from 1 to 25 aromatic rings per one $T_{25}$ structure), more preferably 1 or 2 such aromatic rings per one $T_7$ structure.

Of those conditions, more preferred are (i) and/or (ii).

Preferably, $R_1$ to $R_{14}$ are selected from combinations that include any of (a-3) to (a-4), (b-2) to (b-4) and (c-1) to (c-3), more preferably from those including any of (a-3), (b-2) to (b-3) and (c-1) to (c-73).

In the invention, the resin (A) may be used either singly or as a mixture of two or more different resins. The amount of the resin (A) to be used may be from 40 to 100% by mass, preferably from 60 to 100% by mass, based on the total weight (exclusive of solvent) of the insulating-film forming material.

Specific examples of the repeating units of formula (I) that constitute the resin (A) for use in the first to third aspects of the invention are mentioned below, to which, however, the invention should not be limited. The concrete structures shown herein may be synthesized in the same manner as that mentioned hereinunder optionally followed by functional group conversion.

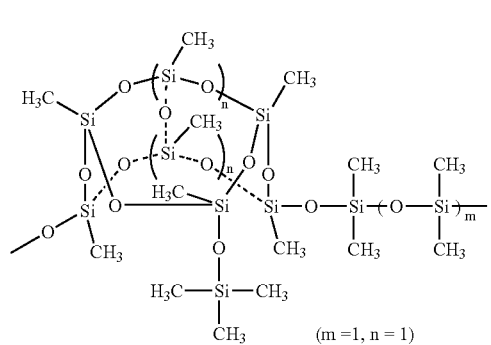
(I-1)

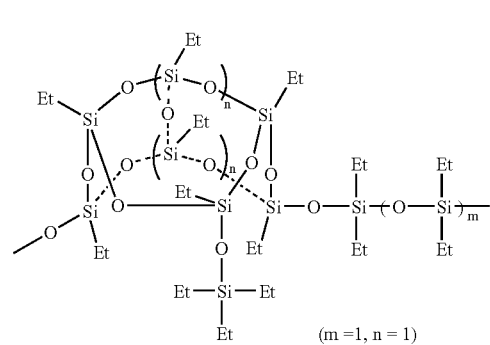
(I-2)

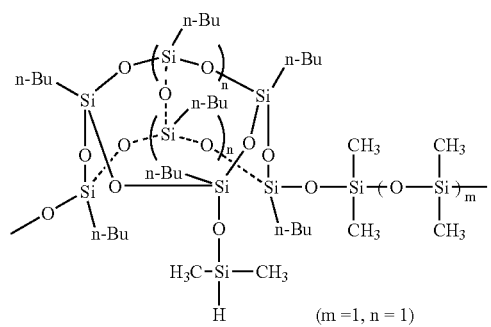
(I-3)

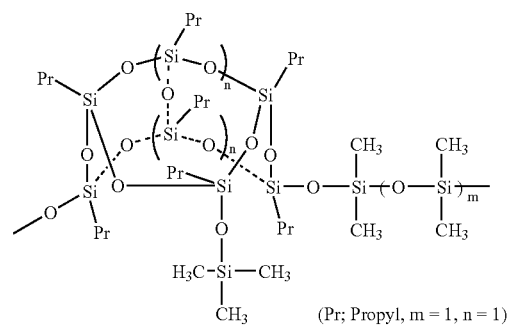
(I-4)

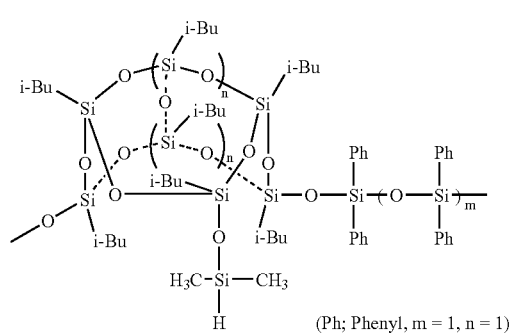
(I-5)

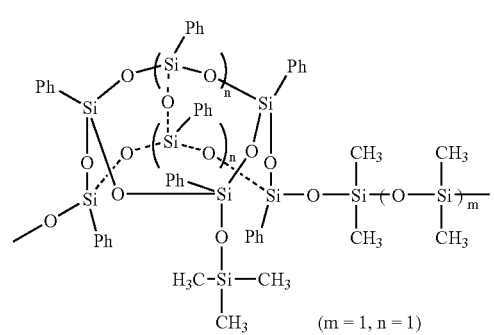
(I-6)

-continued
(I-7)
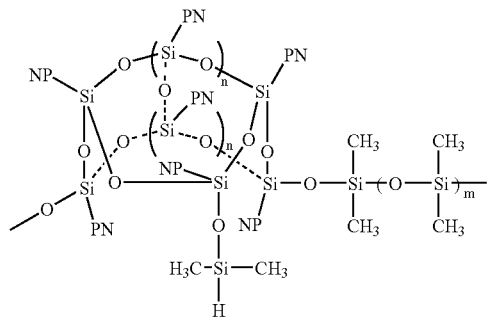
(PN; Phenethyl, m = 1, n = 1)
(I-8)
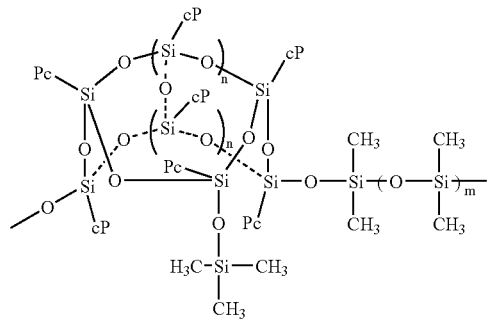
(cp; Cyclopentyl, m = 1, n = 1)
(I-10)
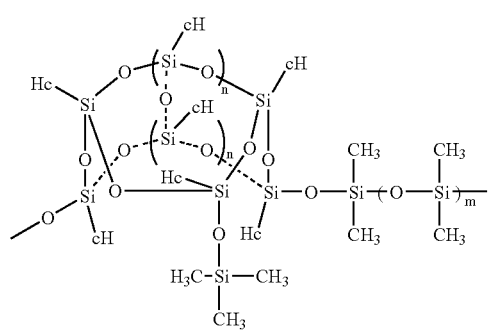
(cH; Cyclohexyl, m = 1, n = 1)
(I-11)
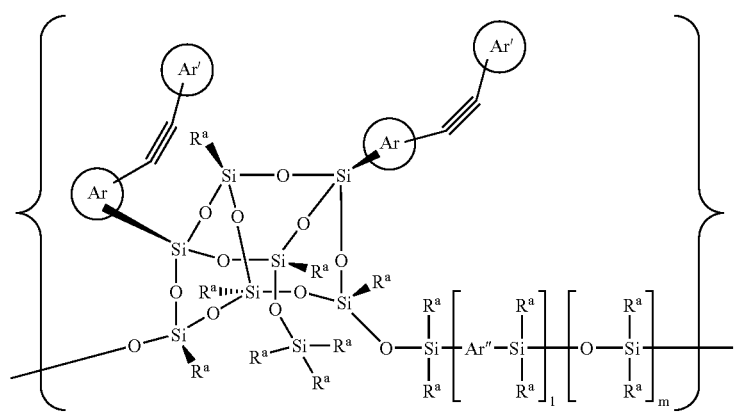
(I-12)
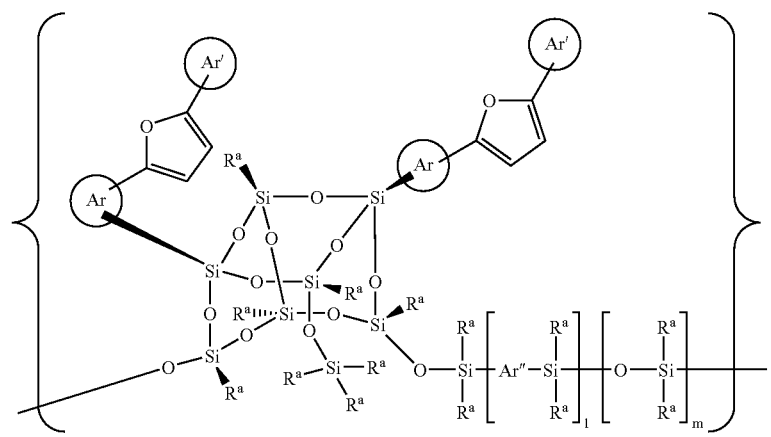

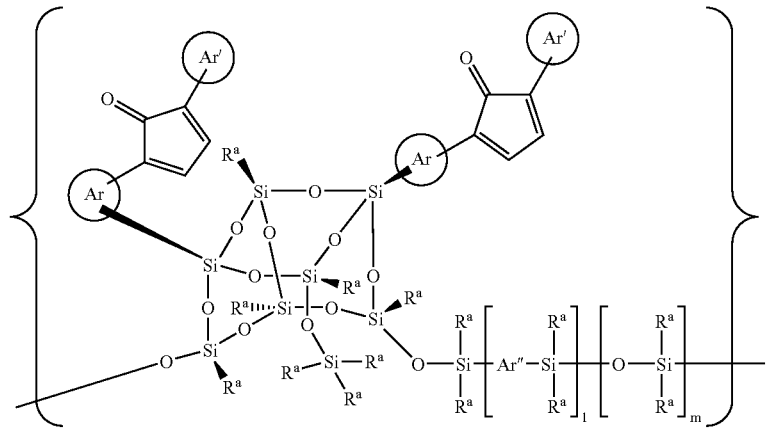

(I-13)

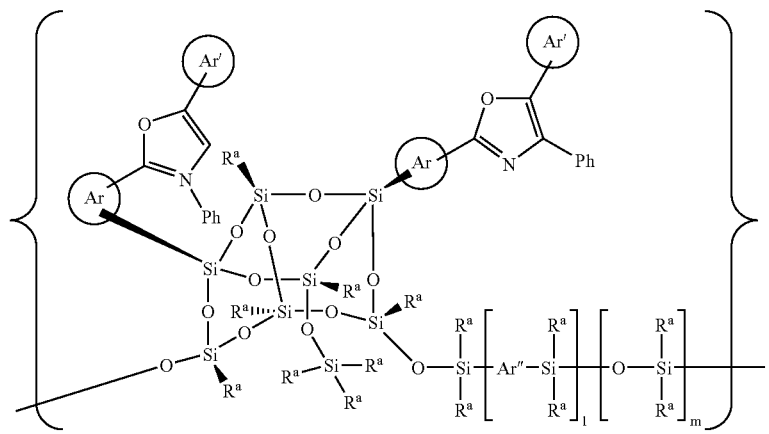

(I-14)

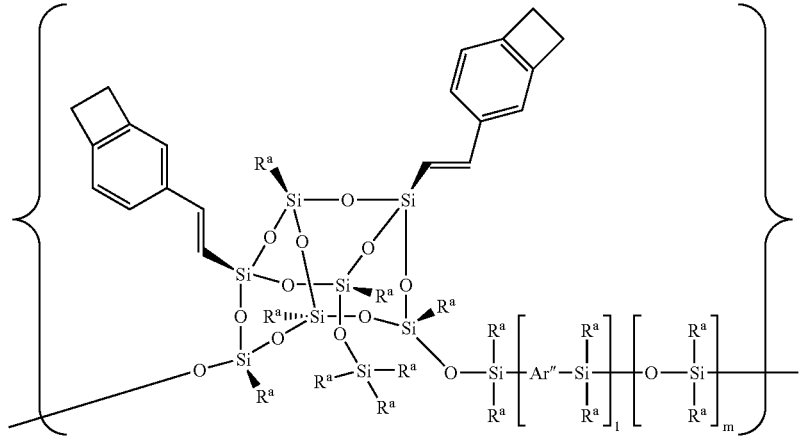

(I-15)

In formulae (I-11) to (I-15), $R^a$ represents a hydrocarbon group not containing an aromatic ring; Ar, Ar' and Ar" each represent an aromatic ring-containing hydrocarbon group. For the substituent groups on Si that contain $R^a$ and Ar, the positions of Si on which they are present may be altered with each other. l indicates 0 or 1. When l is 0, m is an integer of from 0 to 6; and when l is 1, m is 0.

Examples of the hydrocarbon group with no aromatic ring for $R^a$ are those of (a-1). Preferably, Ar, Ar' and Ar" are any of (b-1) to (b-3), including, for example, phenyl, naphthyl, phenylene and naphthylene groups.

In the invention, the resin (A) or (A') may be combined with any other resin. The additional resin includes, for example, ladder-structured polysilsesquioxane resins, hydrolyzates and/or condensates of alkoxysilanes, polyarylene ethers, and hydrocarbon polymers.

The resin (A) for use in the invention may be produced through hydrolysis-condensation under kinetics of a trichlorosilane mixture having, as $R_1$ to $R_7$, specific groups in accordance with the intended product to give a precursor, $T_7$ trisilanol, followed by reaction of the silanol with a organochlorosilane. For example, it may be produced according to the methods described in *J. Am. Chem. Soc.*, 1964, 86, 1120; *J. Am. chem. Soc.*, 1965, 87, 4313; *ACS Polyym. Mat. Sci. & Eng. Preprints* 1998, 79, 389; *J. Am. Chem. Soc.*, 1990, 112, 1931-1936; and *J. Am. Chem. Soc.*, 1989, 111, 1741-1748.

After the basket structure has been formed, or further after it has given a polymer structure, the substituent on the silicon atom of the structure may be substituted with any desired functional group to give the resin for the invention. The reaction for it is, for example, hydrosilylation with a platinum catalyst. Examples of the reaction are disclosed in, for example, JP-A 2000-265065 and JP-A 2000-265066. For it, also preferred is known coupling reaction.

For example, the resin may be produced as follows:

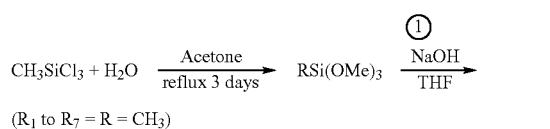

($R_1$ to $R_7 = R = CH_3$)

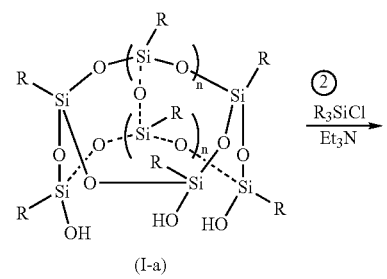

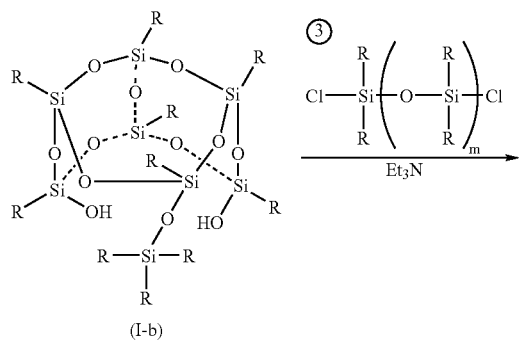

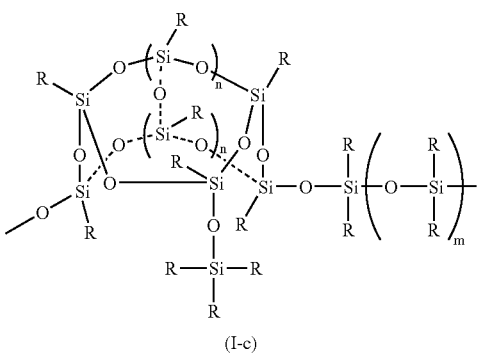

Another example is mentioned below.

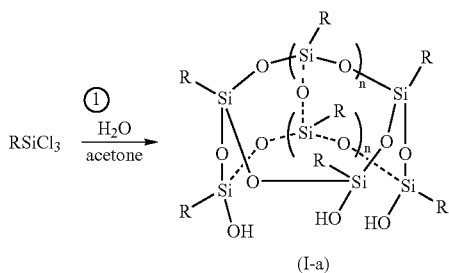

[Other Additives]

The insulating-film forming material of the invention may contain any other component such as colloidal silica, colloidal alumina, organic polymer, surfactant. The colloidal silica is, for example, a dispersion prepared by dispersing high-purity silicic anhydride in a hydrophilic organic solvent such as that mentioned above. In general, it has a mean particle size of from 5 to 30 mµ, preferably from 10 to 20 mµ, and has a solid content of from 10 to 40% by mass or so. The colloidal silica of the type includes, for example, Nissan Chemical's methanol silica sol and isopropanol silica sol; and Shokubai Kasei's Oscal. The colloidal alumina includes, for example, Nissan Chemical's Alumina Sol 520, 100, 200; and Kawaken Fine Chemical's Alumina Clearsol, Alumina Sol 10, 132. The organic polymer includes, for example, polyalkylene oxide structure-having compounds, sugar chain structure-having compounds, vinylamide polymers, (meth)acrylate compounds, aromatic vinyl compounds, dendrimers, polyimides, polyamic acids, polyarylenes, polyamides, polyquinoxalines, polyoxadiazoles, fluoropolymers. The surfactant includes, for example, non-ionic surfactants, anionic surfactants, cationic surfactants, ampholytic surfactants, as well as silicone surfactants, polyalkylene oxide surfactants, and fluorine-containing surfactants.

[Preparation of Resin (A)-containing Material]

The insulating-film forming material of the invention is prepared by dissolving the above-mentioned components in a solvent, and applied onto a support. In preparing the insulating-film forming material of the invention, the resin having a structure of formula (I) of the invention and optionally any other components are mixed, and the method for the preparation is not specifically defined.

Preferred examples of the solvent are ethylene dichloride, cyclohexanone, cyclopentanone, 2-heptanone, methyl isobutyl ketone, γ-butyrolactone, methyl ethyl ketone, methanol, ethanol, dimethylimidazolidinone, ethylene glycol monomethyl ether, ethylene glycol monoethyl ether, ethylene glycoldimethyl ether, 2-methoxyethyl acetate, ethylene glycol monoethyl ether acetate, propylene glycol monomethyl ether (PGME), propylene glycol monomethyl ether acetate (PGMEA), tetraethylene glycol dimethyl ether, triethylene glycol monobutyl ether, triethylene glycol monomethyl ether, isopropanol, ethylene carbonate, ethyl acetate, butyl acetate, methyl acetate, ethyl acetate, methyl methoxypropionate, ethyl ethoxypropionate, methyl pyruvate, ethyl pyruvate, propyl pyruvate, N,N-dimethylformamide, dimethylacetamide, dimethylsulfoxide, N-methylpyrrolidone, tetrahydrofuran, diisopropylbenzene, toluene, xylene, mesitylene. One or more of these solvents may be used herein either singly or as combined.

Of the above, more preferred are propylene glycol monomethyl ether acetate, propylene glycol monomethyl ether, 2-heptanone, cyclohexanone, γ-butyrolactone, ethylene glycol monomethyl ether, ethylene glycol monoethyl ether, ethylene glycol monoethyl ether acetate, propylene glycol monomethyl ether, propylene glycol monoethyl ether, ethylene carbonate, butyl acetate, methyl lactate, ethyl lactate, methyl methoxypropionate, ethyl ethoxypropionate, N-methylpyrrolidone, N,N-dimethylformamide, tetrahydrofuran, methyl isobutyl ketone, xylene, mesitylene, diisopropylbenzene.

The overall solid content of the insulating-film forming material of the invention, thus prepared, is preferably from 2 to 30% by mass, and it may be suitably controlled in accordance with the use of the material. When the overall solid content of the insulating-film forming material is from 2 to 30% by mass, then the thickness of the film formed of the material may fall within a suitable range and the storage stability of the material is better. The number-average molecular weight of the resin having a structure of formula (I) generally falls between 500 and 5,000,000, but preferably between 1,000 and 100,000 or so, more preferably between 2,000 and 20,000 or so.

When the insulating-film forming material of the invention, thus prepared, is applied to a substrate such as silicon wafer, $SiO_2$ wafer or SiN wafer, a coating method of spin-coating, dipping, roll-coating or spraying may be employed.

The dry thickness of the film thus formed of the material may be from 0.05 to 1.5 μm or so in single coating, and from 0.1 to 3 μm or so in double coating. After thus formed, the film may be dried at room temperature or under heat at 80 to 600° C. or so generally for 5 to 240 minutes or so, and it forms a glassy and/or macro-polymer film that serves as an insulating film. For heating the film, for example, employable is any of hot plates, ovens or furnaces. The heating atmosphere may be air, nitrogen or argon, or may be in vacuum or under reduced pressure with controlled oxygen concentration.

More concretely, the insulating-film forming material of the invention is applied onto a substrate (generally metal-wired thereon) in a mode of spin coating, then subjected to first heat treatment at 300° C. or lower for solvent removal and partial crosslinking, and then subjected to second heat treatment (annealing) at a temperature higher than 300° C. but not higher than 450° C. to form an insulating film having a low dielectric constant. The first heat treatment is effected at 300° C. or lower. This is for readily controlling the degree of crosslinking so that the film is not too much crosslinked. The second heat treatment is effected at a temperature higher than 300° C. but not higher than 450° C. This is because the temperature falling within the range is generally good for annealing.

Since the first heat treatment is effected at 300° C. or lower, anyone may take no account of oxidation of the organic part. Therefore, the first heat treatment may be effected even in air. For controlling the dielectric constant of the insulating film formed, the degree of crosslinking of the film may be controlled. Controlling the degree of crosslinking may be attained by controlling the temperature and the time for the heat treatment.

In the second and third aspects of the invention, the porosity of the insulating film being formed may be controlled so as to make the film porous, and the resulting porous, insulating film may have a lower dielectric constant of at most 2.5, preferably at most 2.0.

For making the film porous, employable are (1) a method of mixing the polymer material with a pyrolyzing or vapor reactive substance, and removing the reactive substance after the polymer has cured to thereby obtain a porous material (pyrogel) (second aspect), and (2) a method of mixing the polymer material with hollow particles to form a gel skeleton in wet, and removing the liquid phase such as solvent on the condition that the gel skeleton is not broken to thereby obtain a porous material (xerogel) (third aspect).

More concretely in the second aspect, for example, the compound (B-1) capable of dissolving or dispersing in the insulating-film forming material and having a boiling point or decomposition point falling between 250° C. and 450° C. is added to the material, then the resulting material is applied onto a substrate and heated at a temperature lower than the boiling point or the decomposition point of the compound to thereby partly cure the resin (A) having repeating units of formula (I) of the invention, and then this is further heated at a temperature not lower than the boiling point or the decomposition point of the compound (B-1) to thereby cure the resin, or that is, the resin is cured along with gas generation under heat for boiling or decomposition, and the film thus formed is therefore made porous (for example, refer to JP-A 11-323256, 2001-110601, 2001-2992, 10-283843).

The compound (B-1) includes, for example, (a) polyalkylene oxide structure-having compounds, (b) sugar chain structure-having compounds, (c) vinylamide polymers, (d) (meth)acrylate polymers, (e) aromatic vinyl polymers, (f) dendrimers, (g) oleophilic compounds and dispersants, and (h) organic ultrafine particles. In the invention, the boiling point and the decomposition point are under atmospheric pressure.

(a) Polyalkylene Oxide Structure-having Compounds:

The polyalkylene oxide structure includes, for example, polyethylene oxide structure, polypropylene oxide structure, polytetramethylene oxide structure, polybutylene oxide structure. Concretely, the compounds include ether-structured compounds such as polyoxyethylene alkyl ethers, polyoxyethylene alkyl phenyl ethers, polyoxyethylene sterol ethers, polyoxyethylene lanolin derivatives, ethylene oxide derivatives of alkylphenol-formalin condensates, polyoxyethylene-polyoxypropylene block copolymers, polyoxyethylene-polyoxypropylene alkyl ethers; ether-ester-structured compounds such as polyoxyethylene glycerin fatty acid esters, polyoxyethylene sorbitan fatty acid esters, polyoxyethylene sorbitol fatty acid esters, polyoxyethylene fatty acid alkanolamide sulfates; other ether-ester-structured compounds such as polyethylene glyco fatty acid esters, ethylene glycol fatty acid esters, fatty acid monoglycerides, polyglycerin fatty acid esters, sorbitan fatty acid esters, propylene glycol fatty acid esters, sucrose fatty acid esters.

(b) Sugar Chain Structure-having Compounds:

The sugar chain structure-having compounds include, for example, cyclodextrin, starch, sucrose esters, oligosaccharides, glucose, fructose, mannitol, starch sugar, D-sorbitol, dextran, xanthane gum, curdlane, pullulane, cycloamylose, isomerized sugar, maltitol, cellulose acetate, cellulose, carboxymethyl cellulose, hydroxyethyl cellulose, hydroxypropyl cellulose, methyl cellulose, carboxymethyl cellulose, chitin, chitosan.

Preferably, the sugar chain structure-having compounds for use in the invention are modified partly or completely at the hydroxyl group or the amino group thereof. The chemical modification of hydroxyl group includes, for example, etherification, esterification, trialkylsilyl bond introduction, and urethane bond introduction. The chemical modification of amino group includes, for example, amido bond introduction, urea bond introduction, and imido bond introduction. For the sugar chain structure-having compound, preferred is cyclodextrin as it forms small and readily-controllable pores after decomposition. For the chemical modification, preferred is trialkylsilyl modification and urethanation, and more preferred is trimethylsilyl modification. In order to modify the sugar chain structure-having compound with a trimethylsilyl group, the compound may be reacted with a trimethylsilylating agent such as trimethylchlorosilane or trimethylchlorosilylacetamide. In general, from 5 to 100% of the hydroxyl group of the sugar chain structure-having compound may be substituted for the modification. In order to modify the sugar chain structure-having compound with a trimethylsilyl group, the compound may be reacted with trimethylchlorosilane. In general, from 5 to 100% of the hydroxyl group of the sugar chain structure-having compound may be substituted for the modification. In order to introduce an urethane bond into the sugar chain structure-having compound, the compound may be reacted with an urethanating agent such as phenyl isocyanate or hexyl isocyanate. In general, from 5 to 100% of the hydroxyl group of cyclodextrin may be modified to that effect.

(c) Vinylamide Polymers:

The vinylamide polymers include, for example, poly(N-vinylacetamide), poly(N-vinylpyrrolidone), poly(2-methyl-2-oxazoline), poly(N,N-dimethylacrylamide).

(d) (Meth)acrylate Polymers:

The (meth)acrylate polymers are polymers of radical-polymerizing monomer that comprises, as the essential ingredient thereof, (meth)acrylate such as methyl (meth)acrylate, ethyl (meth)acrylate, butyl (meth)acrylate, benzyl (meth)acrylate, tetrahydrofurfuryl (meth)acrylate, glycidyl (meth)acrylate, hydroxyethyl (meth)acrylate, (meth)acrylamidohydroxypropyl (meth)acrylate.

(e) Aromatic Vinyl Polymers:

The aromatic vinyl polymers include, for example, polystyrene, polymethylstyrene, poly-α-methylstyrene.

(f) Dendrimers:

The dendrimers include, for example, benzyl ether dendrimers, phenylacetylene dendrimers, polyamine dendrimers, polyamide dendrimers. In view of their pyrolyzability, polyamine dendrimers are preferred.

(g) Oleophilic Compounds and Dispersants:

For producing porous films, an oleophilic compound and a dispersant may be added to the film-forming material. Oleophilic compound alone, even though added to the material, is not miscible with the basket-structured organopolysiloxane (polysilsesquioxane) of the invention within a broad composition range. However, when combined with a dispersant, the compound is well miscible with the organopolysiloxane (polysilsesquioxane) of the invention in a broad composition range. The oleophilic compound includes, for example, polycarboxylates such as didecyl phthalate, diundecyl phthalate, didodecyl phthalate, ditridecyl phthalate, tris(2-ethylhexyl) trimellitate, tridecyl trimellitate, tridodecyl trimellitate, tetrabutyl pyromellitate, tetrahexyl trimellitate, tetraoctyl pyromellitate, bis(2-ethylhexyl) dodecanedioate, bisdecyl dodecanedioate. The dispersant that makes the oleophilic compound miscible with the organopolysiloxane is, for example, a higher alcohol such as octanol, lauryl alcohol, decyl alcohol, undecyl alcohol. The amount of the higher alcohol to be used for the dispersant may be from 0.1 to 10 times (by mass) of the oleophilic compound.

(h) Organic Ultrafine Particles:

The organic ultrafine particles are polymer particles having a particle size of at most 100 nm, and they may be prepared through ordinary emulsion polymerization under specific control of the type of the emulsifier to be used, the concentration of the emulsifier and the stirring speed. Briefly, they may be prepared from monomers of aromatic vinyl compounds or (meth)acrylate compounds, combined with crosslinking monomers for particle size control.

In the third aspect of the invention, employed is a method of adding hollow particles (B-2) to the film forming material (e.g., refer to JP-A 11-217458). In this case, the wet gel film formed is dried with no shrinkage of the film. As the case may be, the method may be combined with a method of using a surfactant as a matrix to form a silica film of high regularity or with a supercritical drying aerosol method.

Hollow polymer particles (polymer particles each having a single enclosed void therein) serving as hollow particles have been widely used in the fields of paper, fabrics or leather coating, paint industry, etc., as, for example, organic-based micro-capsule particles in which various materials are filled in the void, or as an organic-based light scattering agent or an organic-based light scattering aid, etc. whereby the light scattering capability caused by making the particles hollow is utilized. The method of producing such hollow polymer particles includes, for example, the one disclosed in Japanese Patent Publications 7688/1991 and 9124/1991, etc., wherein a core formed by emulsion polymerization of a monomer system containing at least one carboxylic acid group and a shell formed by polymerizing a different monomer system (in which at least one monomer is of hard nature, having a Tg exceeding 25° C., not provided with film-forming capability at 20° C., and capable of giving rise to a polymer that permits ammonia and amines to penetrate therethrough) are prepared, and wherein the core is swollen by neutralization with ammonia or an amine followed by drying to form a single void in the core.

As another method, one set forth in Japanese Patent Laid-Open No. 2002-241448 can be mentioned. According to the method, a particulate polymer (A) is prepared by emulsion polymerization of monomers (a) comprising an unsaturated carboxylic cid and a radical polymerizable monomer that can be copolymerized with the carboxylic acid; a particulate polymer (B) is prepared by emulsion-polymerizing 1000 parts by weight of monomers (b) comprising an unsaturated carboxylic acid and a radical polymerizable monomer under the presence of 5 to 1000 parts by weight of the thus prepared particulate polymer (A); adjusting the pH of the dispersion of the particulate polymer (B) at 7 or higher with a volatile base to swell the particulate polymer (B) by neutralization; and thereafter the unreacted portion of the monomer (b) is subjected to polymerization to realize a hollow structure.

On the kind of hollow particles, no special limitation is imparted and commercially available ones or synthetic products can be preferably used. The size of the hollow particles is preferably in the range of from 1 to 5 nm, and preferably from 1 to 2 nm.

The amount of the porous compounds (B-1) and (B-2) to be used for forming the porous insulating film may be generally from 5 to 75% by mass of the resin (A) having repeating units of a structure of formula (I) of the invention.

Within the range, the additional compound may effectively lower the dielectric constant of the film, not lowering the mechanical strength thereof.

Thus formed, the porous insulating film preferably has a porosity of from 10% to 90%, more preferably from 20% to 80%.

On the other hand, in the fourth aspect of the invention, the organic moiety of the organopolysiloxane (polysilsesquioxane) having a specific structure of formula (I') is decomposed through exposure to heat, UV rays or electronic beams, and the film is thereby made to be porous. Specifically, at least one of $R_1$ to $R_{14}$ in the resin (A') satisfies at least one of the following conditions (a) to (c):

(a) having a structure that decomposes under heat at 250° C. to 450° C. to generate gas, (b) having a structure that decomposes through UV irradiation to generate gas, (c) having a structure that decomposes through electron beam irradiation to generate gas.

The structure to satisfy the condition (a) that decomposes under heat at 250° C. to 450° C. to generate gas may be attained by incorporating the structure of the component of (B-1) mentioned above into the resin. Specifically, it includes, for example, (a') polyalkylene oxide structure, (b') sugar chain structure, (c') vinyl amide polymer structure, (d') (meth)acrylate polymer structure, (e') aromatic vinyl polymer structure.

Preferred are (a'), (b') and (d'); and more preferred is (a'). Specifically, the polyalkylene oxide structure includes, for example, polyethylene oxide structure, polypropylene oxide structure, polytetramethylene oxide structure, polybutylene oxide structure. Concretely, it includes ether structures such as polyoxyethylene alkyl ether structure, polyoxyethylene alkyl phenyl ether structure, polyoxyethylene sterol ether structure, polyoxyethylene lanolin derivative structure, ethylene oxide derivative structure of alkylphenol-formalin condensate, polyoxyethylene-polyoxypropylene block copolymer structure, polyoxyethylene-polyoxypropylene alkyl ether structure; ether-ester structures such as polyoxyethylene glycerin fatty acid esters, polyoxyethylene sorbitan fatty acid esters, polyoxyethylene sorbitol fatty acid esters, polyoxyethylene fatty acid alkanolamide sulfates; other ether-ester structures such as polyethylene glycol fatty acid esters, ethylene glycol fatty acid esters, fatty acid monoglycerides, polyglycerin fatty acid esters, sorbitan fatty acid esters, propylene glycol fatty acid esters, sucrose fatty acid esters.

The structure to satisfy the condition (b) that decomposes through UV irradiation to generate gas includes, for example, optical acid generator structure itself, optical base generator structure itself, combination of optical acid generator and acid-decomposing group-containing structure, combination of optical base generator and base-decomposing group-containing structure, and structure that enables optical elimination reaction. Opticale limination reaction structure is preferred, such as optical decarboxylation structure or optical denitrogenation structure, since it leaves no polar group after gas generation. For the optical decarboxylation structure, preferred is acetic acid structure with any of O, S and N substituted therein, such as phenoxyacetic acid, phenylthioacetic acid, and N-phenylglycine structure, since it undergoes optical decarboxylation. Denitrogenation compound structure such as azide and diazonium is also usable.

The structure to satisfy the condition (c) that decomposes through electron beam irradiation to generate gas includes, for example, the same structures as those of the abovementioned (b), and alkyl sulfone and aryl sulfone structures. Alkyl sulfone structure is preferred.

In the fourth aspect of the invention, the other $R_1$ to $R_{14}$ than those that satisfy at least one condition of the abovementioned (a) to (c) are not specifically defined. For these, preferred are $R_1$ to $R_{14}$ that satisfy the condition described in the first to third aspects.

In the fourth aspect of the invention, $R_{15}$ to $R_{17}$ are not specifically defined. For these, preferred are $R_{15}$ to $R_{17}$ that satisfy the condition described in the first to third aspects.

For the preferred embodiments of the preparation of the resin (A'), the molecular weight of the resin (A'), the resin that may be combined with the resin (A'), other additives, the preparation of the material (composition), the coating method and the heat treatment in the fourth aspect of the invention, referred to are those mentioned hereinabove in the section of the first to third aspects. When the heat treatment is combined with UV irradiation or electron beam irradiation, its preferred embodiments are mentioned below.

The wavelength of UV to be used is not specifically defined, but preferably falls between 150 nm and 450 nm. The absorption wavelength may be suitably varied and determined depending on the structure of $R_1$ to $R_{14}$.

The accelerating voltage of the electron beams to be used is not specifically defined, but preferably falls between 1 and 100 kV, more preferably between 2 and 60 kV.

Thus formed, the interlayer insulating film is excellent in point of the insulating properties, the film uniformity, the dielectric characteristics, the cracking resistance and the surface hardness, and is therefore useful in many applications, for example, for interlayer insulating films for semiconductor devices such as LSI, system LSI, DRAM, SDRAM, RDRAM, D-RDRAM, protective films such as surface coating films for semiconductor devices, interlayer insulating films for multi-layer wiring substrates, protective films and insulating-protective films for liquid-crystal display devices.

EXAMPLES

The invention is described more concretely with reference to the following Examples. In these, parts and % are all by mass, unless otherwise specifically indicated. The insulating-film forming material was analyzed and evaluated according to the methods mentioned below.

[Weight-average Molecular Weight (Mw)]

Measured through gel permeation chromatography (GPC) under the condition mentioned below.

<Sample> Tetrahydrofuran was used as a solvent. 0.01 g of a sample was dissolved in 2 cc of tetrahydrofuran.

<Standard polystyrene> Tosoh's standard polystyrene, TSK Standard.

<Apparatus> Tosoh's high-performance gel permeation chromatogram (HLC-8200 GPC).

<Column> Tosoh's TSK-gel (GMX).

<Test temperature> 40° C., at flow rate of 1 cc/min.

[In-plane Uniformity]

A sample of insulating-film forming material was applied onto a 6-inch silicon wafer with a spin coater at 1500 to 2500 rpm for 20 seconds. Next, the silicon wafer thus coated with the insulating-film forming material was heated by the use of a hot plate kept at 80° C., for 5 minutes to remove the organic solvent. Next, this was further heated by the use of a hot plate kept at 200° C., for 5 minutes to thereby form a coating film on the silicon wafer. Thus formed, the film was analyzed with an optical film thickness meter (Dainippon Screen's Lambda Ace) on 50 in-plane points of the film. 3σ of the film thickness was obtained from the data, and the film was evaluated for the in-plane uniformity thereof, according to the following criteria.

Good: The 3σ value of the film does not exceed 3% of the average film thickness.

Bad: The 3σ value of the film is 3% or more of the average film thickness.

[Cracking Resistance]

A sample of insulating-film forming material was applied onto a 6-inch silicon wafer with a spin coater, and dried on a hot plate at 80° C. for 5 minutes and then at 200° C. for 5 minutes. Further, this was baked in a nitrogen atmosphere oven at 450° C. for 60 minutes. The outward appearance of the coating film formed on the substrate was observed with a pocket microloupe (×50) (by Peak), and evaluated according to the following criteria. In addition, the sample was subjected to PCT (JDECJESD22-A102-B, 121° C., 100% RH, 15 psig) for 96 hours, and evaluated in the same manner.

Good: No crack found in the surface of the film.

Not good: Cracks found in the surface of the film.

[Dielectric Constant]

A sample of insulating-film forming material was applied onto a 6-inch silicon wafer with a spin coater, and dried on a hot plate at 80° C. for 5 minutes and then at 200° C. for 5 minutes. Further, this was baked in a nitrogen atmosphere oven at 450° C. for 60 minutes. Aluminium was deposited on the thus-coated substrate to form a sample for measurement of dielectric constant. The dielectric constant was calculated from the capacity at 1 MHz by using a mercury probe manufactured by Four Dimensions, Inc. and a HP4285A LCR meter manufactured by Yokogawa HP, Inc. In addition, the sample was subjected to PCT (JDECJESD22-A102-B, 121° C., 100% RH, 15 psig) for 96 hours, and measured and analyzed in the same manner.

Production Example 1

<Production of Polymer (I-10)>

(1) Production of Trisilanol:

50 g of cyclohexyltrichlorosilane was dissolved in 920 ml of acetone. 250 ml of distilled water was gradually added to the resulting solution at room temperature, and then reacted at room temperature for 2 weeks. The resulting precipitate was recrystallized from diethyl ether to obtain a trisilanol.

(2) Production of Monosilyl Compound:

10 g of the trisilanol obtained in the above (1) was dissolved in 200 ml of THF, and 10.4 g of triethylamine was added thereto. 1.28 g of chlorotrimethylsilane was dropwise added to the solution with stirring. Next, this was reacted at 25° C. for 20 hours. The reaction solution was filtered (to remove triethylammonium hydrochloride), and concentrated under reduced pressure to obtain a white solid. This was extracted with hexane and recrystallized to obtain a monosilanol.

(3) Production of Polymer:

7.0 g of the monosilyl compound obtained in the above (2) was dissolved in 110 ml of THF, and 3.0 g of triethylamine was added thereto 1.50 g of 1,3-dichlorotetramethyldicyclohexane was dropwise added to the solution with stirring. This was reacted at room temperature for 5 hours and then at 60° C. for 6 hours. The reaction mixture was put into 2.0 liters of ultra-pure water, and a powdery precipitate deposited therein. Thus obtained, the resin was dried in a vacuum drier at 120° C. for 12 hours to obtain a polymer (I-10). The weight-average molecular weight of the polymer (I-10) was 12,000.

Production Example 2

Using 30 g of a mixture of ethyltrichlorosilane/4-bromophenyltrichlorosilane (5/2 by mol), a resin was obtained in the same manner as in Production Example 1. Next, the same equivalent, as that of the intermediate, of tin-terminated salt of phenylacetylene was dissolved in THF, and coupled with the intermediate by the use of a palladium(0) catalyst to obtain a triple bond-having compound. The product was processed in an ordinary manner, and the resulting solid was purified through chromatography to obtain a sample (A-1) (20 g; Mw 9,000).

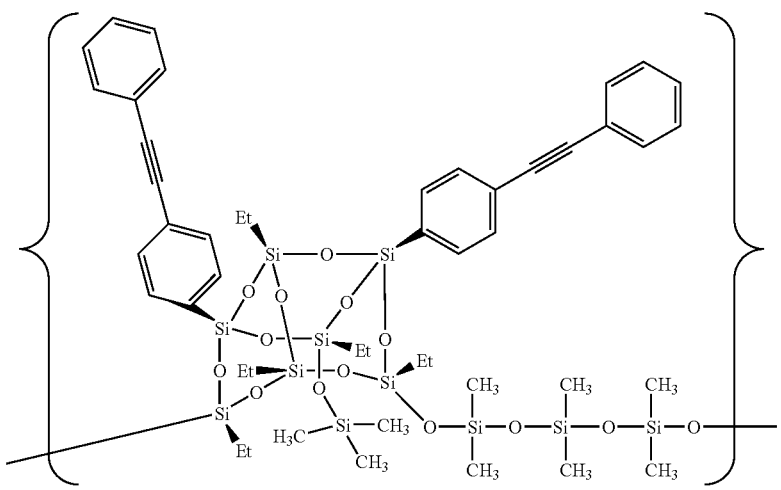

In the same manners the sample was reacted with 2-phenylfuran to obtain (A-2) (Mw 8,000).

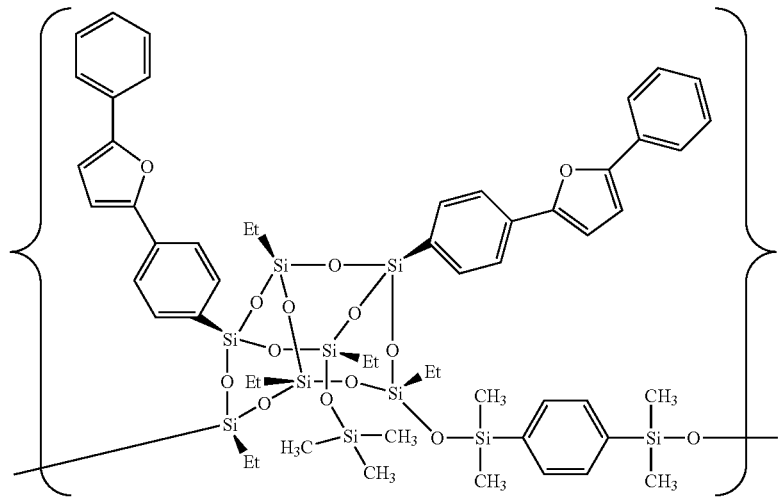

Production Example 3

In Production Example 2, ethyltrichlorosilane was partly changed to t-butoxyphenyltrichlorosilane to prepare t-butoxyphenyltrichlorosilane/ethyltrichlorosilane/-bromophenyltrichlorosilane (2/3/2), and the tin salt in the coupling reaction was changed to a salt of 1,3-diethynylbenzene, and an intermediate resin was obtained through polymerization. Thus obtained, the solid was processed with acid for deprotection, and then reacted with methyl-semiterminated oligoethylene oxide (number of repeating units: about 20) in the presence of a base catalyst in an ordinary manner. This was washed with methanol to give a sample (A-3) having a structure mentioned below (Mn 11,000 (through GPC)).

Example 1

5 g of the sample (A-1) obtained in Production Example 2 was dissolved in 45 g of a mixed solvent of diisopropylbenzene/cyclohexanone/propylene glycol monomethyl ether, and the resulting solution was filtered through a 0.2 μm-pore Teflon filter, and applied onto a silicon wafer with a spin coater. The thickness of the film thus formed was 680 nm, and 3σ thereof was 2% of the average film thickness. The film was good. Films of different thickness were formed in the same manner, and the maximum thickness of the film with no crack was 1,250 nm. This supports good cracking resistance of the film. The dielectric constant of the film was measured, and it was 2.64 and was extremely low.

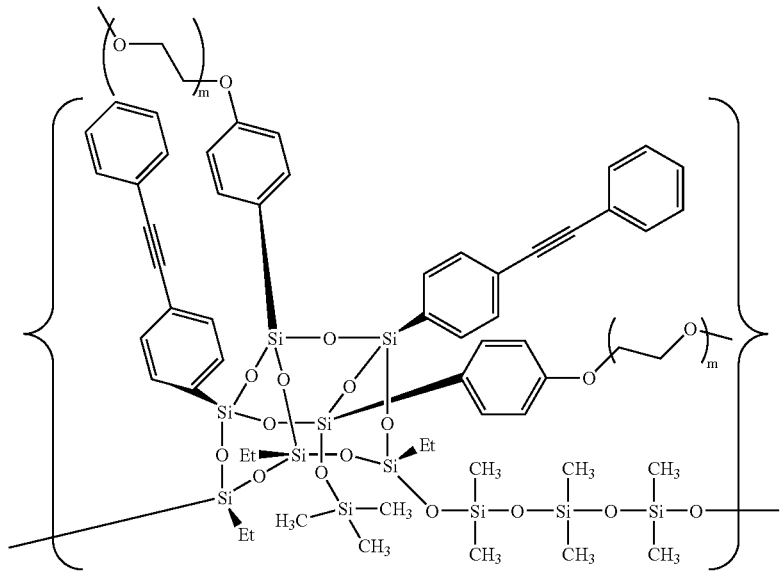

Example 2

Films were formed and evaluated in the same manner as in Example 1, for which, however, 10% polymer (I-10) was added to the sample (A-1). The result is given in Table 1.

Example 3

Films were formed and evaluated in the same manner as in Example 1, for which, however, 5 g of a mixture of sample (A-1)/sample (A-2) (1/1 by weight) was used. The solvent amount was controlled. The result is given in Table 1.

Examples 4 to 6

Films were formed and evaluated in the same manner as in Example 1, for which, however, 5 g of a mixture of sample (A-1)/diphenylacetylene (about 8/2 by weight), sample (A-2)/diphenylacetylene (about 8/2 by weight), or sample (A-1)/polymer (I-10)/diphenylacetylene (about 8/1/1 by weight) was used. The solvent amount was suitably controlled. The result is given in Table 1.

TABLE 1

|  | In-plane Uniformity | Cracking Resistance | Cracking Resistance after PCT | Dielectric Constant | Dielectric Constant after PCT |
|---|---|---|---|---|---|
| Example 1 | good | good | good | 2.64 | 2.64 |
| Example 2 | good | good | good | 2.64 | 2.64 |
| Example 3 | good | good | good | 2.63 | 2.63 |
| Example 4 | good | good | good | 2.56 | 2.56 |
| Example 5 | good | good | good | 2.55 | 2.55 |
| Example 6 | good | good | good | 2.54 | 2.54 |

For comparison, an insulating film formed in the same manner as in Example 1 in JP-A 11-40554 was evaluated in the same manner as that for the insulating film of this Example 1. The comparative film had a dielectric constant of 2.80, and its dielectric constant increased to 3.20 after PCT.

Example 7

3 g of the sample (A-1) obtained in Production Example 2 and 3 g of polyethylene oxide block-polypropylene oxide block-polyethylene oxide block copolymer (Newpole PE-61, by Sanyo Chemical, Decomposition point 350° C.) were dissolved in 45 g of a mixed solvent of diisopropylbenzene/cyclohexanone/propylene glycol monomethyl ether, and the resulting solution was filtered through a 0.2 µm-pore Teflon filter, and applied onto a silicon wafer with a spin coater. The thickness of the film thus formed was 580 nm, and 3σ thereof was 40 nm. The film was good. Films of different thickness were formed in the same manner, and the maximum thickness of the film with no crack was 1,400 nm. This supports good cracking resistance of the film. The dielectric constant of the film was measured, and it was 2.11 and was extremely low.

Example 8

Films were formed and evaluated in the same manner as in Example 7, for which, however, 5 g of the sample (A-3) was used and Newpole PE-61 was not used. The result is given in Table 2.

Example 9

Films were formed and evaluated in the same manner as in Example 1, for which, however, 7 g of a mixture of sample (A-1)/sample (A-2)/Newpole PE-61 (1/1/1 by mass) was used. The solvent amount was controlled. The result is given in Table 2.

Examples 10 to 11

Films were formed and evaluated in the same manner as in Example 7, for which, however, 7 g of a mixture of sample (A-1)/diphenylacetylene/Newpole PE-61, or sample (A-2)/diphenylacetylene/Newpole PE-61 (about 8/1/8 by mass) was used. The solvent amount was suitably controlled. The result is given in Table 2.

Example 12

Films were formed and evaluated in the same manner as in Example 7, for which, however, 4.5 g of a mixture of sample (A-3)/diphenylacetylene (about 8/1 by mass) was used. The solvent amount was suitably controlled. The result is given in Table 2.

TABLE 2

|  | In-plane Uniformity | Cracking Resitance | Cracking Resistance after PCT | Dielectric Constant | Dielectric Constant after PCT |
|---|---|---|---|---|---|
| Example 7 | good | good | good | 2.11 | 2.11 |
| Example 8 | good | good | good | 2.13 | 2.13 |
| Example 9 | good | good | good | 2.16 | 2.16 |
| Example 10 | good | good | good | 2.13 | 2.13 |
| Example 11 | good | good | good | 2.09 | 2.09 |
| Example 12 | good | good | good | 2.13 | 2.13 |

Films were formed and evaluated in the same manner as in Example 8, for which, however, the sample (A-3) 4.95 g/triphenylsulfonium triflate 0.05 g was used, and, before the second heat treatment, the substrate was divided and exposed to UV rays (100 mJ/cm$^2$, using Ushio Electric's low-pressure mercury lamp UIS-112 and 250 nm-band pass filter). They had a dielectric resistance of 2.16.

Films were formed and evaluated in the same manner as in Example 8, for which, however, the sample (A-3) 4.95 g/triphenylsulfonium triflate 0.05 g was used, and, before the second heat treatment, the substrate was divided and exposed to electron beams (50 kV, 80 µC/cm$^2$, Ushio Electric's Min-EB). They had a dielectric resistance of 2.13.

For comparison, an insulating film formed in the same manner as in Example 1 in JP-A 11-40554 was evaluated in the same manner as that for the insulating film of Example 7. The comparative film had a dielectric constant of 2.80, and its dielectric constant increased to 3.20 after PCT.

A coated film was formed in the same manner as in Example 9 except that cross-linked hollow polymer particles with a particle size of 2 nm were used instead of New Pole PE-61. A result similar to that of Example 9 was obtained.

The invention provides an insulating-film forming material (interlayer insulating-film material) that contains a specific basket-structured organopolysiloxane (polysilsesquioxane) and forms a coating film well balanced in point of the thickness uniformity, the cracking resistance and the dielectric characteristics thereof.

The entire disclosure of each and every foreign patent application from which the benefit of foreign priority has been claimed in the present application is incorporated herein by reference, as if fully set forth.

What is claimed is:

1. An insulating-film forming material comprising a polymer (A) that has, as a repeating unit thereof, a structure represented by the following general formula (I):

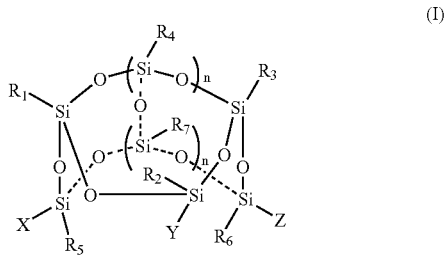

wherein $R_1$ to $R_7$ are the same or different, and each represents a monovalent group;
one of X, Y and Z represents a group represented by formula (IA), and another one of X, Y and Z is —O—, and the other one of X, Y and Z is a group represented by formula (IB) wherein the oxygen atom that directly bonds to the silicon atom in formula (IB) is also connected to formula (I); and n indicates an integer of from 1 to 10:

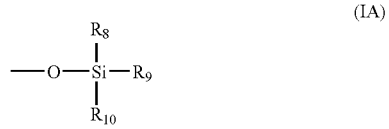

wherein $R_8$ to $R_{10}$ are the same or different, and each represents a monovalent group,

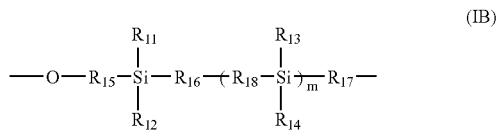

wherein $R_{11}$ to $R_{14}$ are the same or different, and each represents a monovalent group;
$R_{15}$ to $R_{17}$ are the same or different, and each represents a single bond or a divalent group;
$R_{18}$ represents a single bond or —O—;
m indicates an integer of from 0 to 10; and
at least one of $R_1$ to $R_{17}$ in formula (I) includes at least one carbon-carbon triple bond or is a monovalent group capable of becoming a hydrocarbon group through a Diels-Alder reaction followed by an elimination reaction.

2. The insulating-film forming material as claimed in claim 1, wherein $R_1$ to $R_{14}$ in formula (I) are the same or different, and each represents a hydroxyl group, a monovalent hydrocarbon group, a monovalent group capable of becoming a hydrocarbon group through a Diels-Alder reaction followed by an elimination reaction, a group derived from a monovalent hydrocarbon group by substituting a part of the carbon atom(s) in the monovalent hydrocarbon group with a silicon atom, or a group derived from a monovalent group capable of becoming a hydrocarbon group through a Diels-Alder reaction followed by an elimination reaction, by substituting a part of the carbon atom(s) in the monovalent group with a silicon atom, and $R_{15}$ to $R_{17}$ are the same or different, and each represents a single bond, a divalent hydrocarbon group, or a divalent group capable of becoming a hydrocarbon group through a Diels-Alder reaction followed by an elimination reaction, provided that at least one of $R_1$ to $R_{17}$ in formula (I) includes at least one carbon-carbon triple bond or is a monovalent group capable of becoming a hydrocarbon group through a Diels-Alder reaction followed by an elimination reaction.

3. An insulating film obtained by using an insulating-film forming material as claimed in claim 1.

4. A porous insulating-film forming material comprising:
a polymer that has, as a repeating unit thereof, a structure represented by formula (I); and
at least one of a compound (B-1) and particles (B-2),
(B-1) a compound having a boiling or decomposition point of 250° C. to 450° C.,
(B-2) hollow particles:

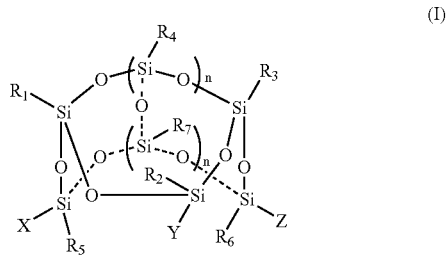

wherein $R_1$ to $R_7$ are the same or different, and each represents a monovalent group;
one of X, Y and Z represents a group represented by formula (IA), and another one of X, Y and Z is —O—, and the other one of X, Y and Z is a group represented by formula (IB) wherein the oxygen atom that directly bonds to the silicon atom in formula (IB) is also connected to formula (I); and n indicates an integer of from 1 to 10:

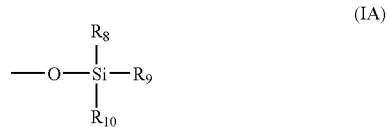

wherein $R_8$ to $R_{10}$ are the same or different, and each represents a monovalent group,

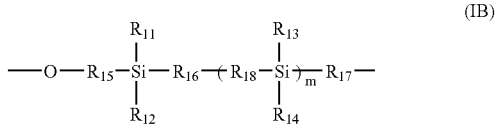

wherein $R_{11}$ to $R_{14}$ are the same or different, and each represents a monovalent group;
$R_{15}$ to $R_{17}$ are the same or different, and each represents a single bond or a divalent group;
$R_{18}$ represents a single bond or —O—;
m indicates an integer of from 0 to 10; and at least one of $R_1$ to $R_{17}$ in formula (I) includes at least one carbon-carbon triple bond or is a monovalent group capable of becoming a hydrocarbon group through a Diels-Alder reaction followed by an elimination reaction.

5. A porous insulating-film forming material comprising a polymer that has, as a repeating unit thereof, a structure represented by formula (I'):

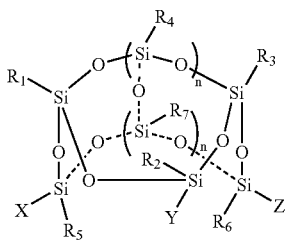

wherein $R_1$ to $R_7$ are the same or different, and each represents a monovalent group; one of X, Y and Z represents a group represented by formula (IA), and another one of X, Y and Z is —O—, and the other one of X, Y and Z is a group represented by formula (IB) wherein the oxygen atom that directly bonds to the silicon atom in formula (IB) is also connected to formula (I'); and n indicates an integer of from 1 to 10:

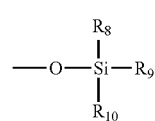

wherein $R_8$ to $R_{10}$ are the same or different, and each represents a monovalent group,

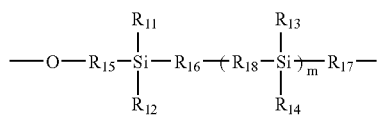

wherein $R_{11}$ to $R_{14}$ are the same or different, and each represents a monovalent group;

$R_{15}$ to $R_{17}$ are the same or different, and each represents a single bond or a divalent group;

$R_{18}$ represents a single bond or —O—;

m indicates an integer of from 0 to 10; and at least one of $R_1$ to $R_{17}$ in formula (I) includes at least one carbon-carbon triple bond or is a monovalent group capable of becoming a hydrocarbon group though a Diels-Alder reaction followed by an elimination reaction.

6. The porous insulating-film forming material as claimed in claim 4, wherein at least one of $R_1$ to $R_{17}$ in formula (I) additionally satisfies at least one of the following conditions (α) and (β):

(α) at least one of $R_1$ to $R_{14}$ is a monovalent hydrocarbon group, a monovalent group capable of becoming a hydrocarbon group through a Diels-Alder reaction followed by an elimination reaction, a group derived from a monovalent hydrocarbon group by substituting a part of the carbon atom(s) in the monovalent hydrocarbon group with a silicon atom, or a group derived from a monovalent group capable of becoming a hydrocarbon group through a Diels-Alder reaction followed by an elimination reaction, by substituting a part of the carbon atom(s) in the monovalent group with a silicon atom; and (β) at least one of $R_{15}$ to $R_{17}$ is a divalent hydrocarbon group, or a divalent group capable of becoming a hydrocarbon group through a Diels-Alder reaction followed by an elimination reaction.

7. The porous insulating-film forming material as claimed in claim 5, wherein at least one of $R_1$ to $R_{17}$ in formula (I') additionally satisfies at least one of the following conditions (α) and (β):

(α) at least one of $R_1$ to $R_{14}$ is a monovalent hydrocarbon group, a monovalent group capable of becoming a hydrocarbon group through a Diels-Alder reaction followed by an elimination reaction, a group derived from a monovalent hydrocarbon group by substituting a part of the carbon atom(s) in the monovalent hydrocarbon group with a silicon atom, or a group derived from a monovalent group capable of becoming a hydrocarbon group through a Diels-Alder reaction followed by an elimination reaction, by substituting a part of the carbon atom(s) in the monovalent group with a silicon atom; and (β) at least one of $R_{15}$ to $R_{17}$ is a divalent hydrocarbon group, or a divalent group capable of becoming a hydrocarbon group through a Diels-Alder reaction followed by an elimination reaction.

8. A porous insulating film obtained by using an insulating-film forming material as claimed in claim 4.

9. A porous insulating film obtained by using an insulating-film forming material as claimed in claim 5.

10. The insulating-film forming material as claimed in claim 1, wherein at least one of $R_1$ to $R_{17}$ in formula (I) satisfies the condition that at least one of $R_1$ to $R_{17}$ includes at least one carbon-carbon triple bond.

11. The insulating-film forming material as claimed in claim 1, wherein at least one of $R_1$ to $R_{17}$ in formula (I) is a monovalent group capable of becoming a hydrocarbon group through a Diels-Alder reaction followed by an elimination reaction.

12. The insulating film as claimed in claim 3, wherein the insulating film is obtained by coating a substrate with the insulating-film forming material as claimed in claim 1 and then drying and heating the insulating-film forming material.

* * * * *